Dec. 2, 1924.

B. C. STELL ET AL

APPARATUS FOR EXTRACTING FAT

Filed July 19, 1923

1,517,763

Inventor
BERNARD C. STELL
JAMES M. SPRING

By

Attorney

Patented Dec. 2, 1924.

1,517,763

UNITED STATES PATENT OFFICE.

BERNARD C. STELL AND JAMES M. SPRING, OF NORFOLK, VIRGINIA.

APPARATUS FOR EXTRACTING FAT.

Application filed July 19, 1923. Serial No. 652,608.

*To all whom it may concern:*

Be it known that we, BERNARD C. STELL and JAMES M. SPRING, citizens of the United States, residing at Norfolk, in the county of Norfolk and State of Virginia, have invented certain new and useful Improvements in Apparatus for Extracting Fat, of which the following is a specification.

This invention relates to apparatus for extracting fats and drying residues after extraction of fats.

An object of the invention is to provide an improved method of extracting fats from fatty materials.

A further object is the provision of improved means for separating the solvent from the fat.

A further object is the provision of improved heating means for drying the residue from which the fat has been extracted for use as a fertilizer or feed.

In the accompanying drawings, we have shown one embodiment of the invention. In this showing:—

Figure 1:
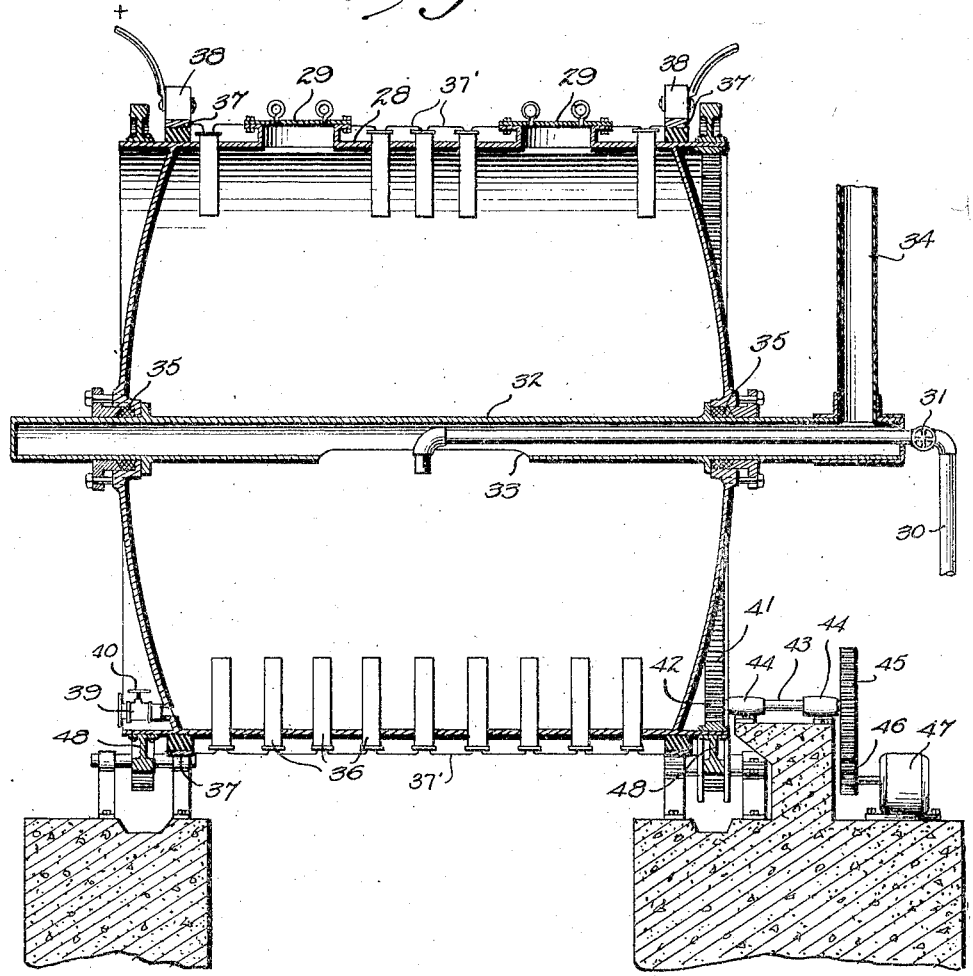
Figure 2:
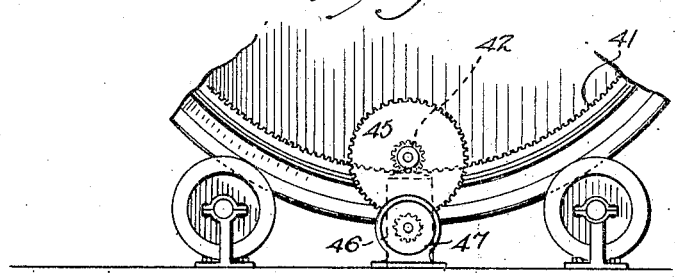

Figure 1 is a vertical sectional view of an extracting tank in which the fat is extracted from the fatty material, and, Figure 2 is an end elevation of a portion of the tank showing the drive means.

Referring to the drawings, the extractor consists of an outer shell 28 having suitable manholes 29 arranged therein by means of which the raw material may be delivered thereto. The solvent is delivered to the interior of the extractor by means of a pipe 30 having a control valve 31. This pipe extends through a substantially large stationary pipe 32, arranged centrally of the extractor. The pipe 32 is provided with a central opening 33 for the admission of solvent vapor and one end of this pipe communicates with a pipe 34 connected to a suitable condenser (not shown). As shown, suitable packing glands 35 are arranged at the ends of the shell where the pipe 32 passes through the shell. Heating elements 36 are arranged in the shell and these heating elements are adapted to be connected to a source of current by means of a ring 37 arranged on the shell and a brush 38 contacting therewith. As shown, the ring is connected to the heating elements by connections 37'. The extractor is provided with a draw-off pipe 39 having a suitable control valve 40. Means are provided for rotating the extractor, consisting of a ring gear 41 mounted on one end of the extractor shell and meshing with a pinion 42 on a shaft 43. This shaft is mounted in suitable bearings 44 and is provided with a gear 45 on one end, meshing with a pinion 46 on the shaft of a motor 47. The extractor rides on suitable tracks 48 arranged at each end thereof and may be driven at any desired speed by means of the motor 47.

In operation, the raw material is placed inside of extractor in a dry state through the manhole openings 29. The manholes are then closed and the solvent is pumped in through the pipe 30 from a suitable storage tank. When sufficient solvent has been delivered to the extractor, the valve 31 is closed. The extractor is then rotated, causing the raw material and the solvent to become thoroughly mixed, the solvent collecting and extracting the fat contained in the raw material. Any solvent vaporized passes out through the opening 33 in the pipe 32 and thence through the pipe 34 to a condenser. After the fat has been extracted forming a solution in the solvent, this solution is then pumped off through the outlet pipe 39 to a settling tank. The raw material or residue remaining in the extractor is then subjected to heat by the heating elements 36 and the temperature is raised to a temperature of substantially 800° F. This vaporizes all solvents left in the material which are collected through the pipes 32 and 34. When the residue is thoroughly dry, it is removed through the manhole openings 29 and may be used for feed or fertilizer, depending upon the material from which the fat is extracted.

By employing the electric heating elements 36 in the extractor, it is possible to heat the material to a temperature of 800° F. or more, which is materially greater than the highest temperature that can possibly be obtained by means of steam heat. This permits the residue to be dried in the extractor. The use of electric heating elements is a decided economy in practising the process, and is preferred to steam for this reason.

It is to be understood that the form of the invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. An extractor comprising a shell, means for rotating said shell, a stationary pipe arranged centrally of said shell and projecting beyond the ends thereof, said pipe being provided with an elongated opening within the shell, and a feed pipe arranged within said stationary pipe and having an open inner end projecting from said elongated opening.

2. An extractor comprising a shell, means for rotating said shell, packing glands arranged in the end walls of said shell, a closed pipe extending through said glands and projecting from said extractor, said pipe being provided with an opening within said shell, an outlet pipe connected to said pipe exteriorly of said shell, and a feed pipe arranged within said pipe and having an open inner end projecting from said opening.

3. A device constructed in accordance with claim 1 wherein electric heating elements are arranged in said shell and said shell is provided with a conductor ring connected to said heating elements, and a brush adapted to contact with said ring when the shell is rotated.

In testimony whereof, we affix our signatures, in presence of two witnesses.

BERNARD C. STELL.
JAMES M. SPRING.

Witnesses:
T. L. WEST,
O. O. CRUMPLER.